United States Patent
Komorous-Towey et al.

(10) Patent No.: US 8,376,805 B2
(45) Date of Patent: Feb. 19, 2013

(54) PRINTABLE PRE-SEWN STUFFED TOY COMPOSITE SHEETS

(75) Inventors: Vlasta Anastasia Komorous-Towey, Berkeley, CA (US); Brian Benjamin Witlin, Mountain View, CA (US); Joseph Berteel Wilcox, Menlo Park, CA (US); Gina Lynn Romero, Soquel, CA (US); Brendan John Boyle, Palo Alto, CA (US); James Adam Skaates, San Francisco, CA (US)

(73) Assignee: IDEO LLC, Palo Alto, CA (US)

( * ) Notice: Subject to any disclaimer, the term of this patent is extended or adjusted under 35 U.S.C. 154(b) by 975 days.

(21) Appl. No.: 12/410,295

(22) Filed: Mar. 24, 2009

(65) Prior Publication Data

US 2010/0023148 A1 Jan. 28, 2010

Related U.S. Application Data

(60) Provisional application No. 61/135,856, filed on Jul. 24, 2008, provisional application No. 61/194,593, filed on Sep. 29, 2008.

(51) Int. Cl.
 *A63H 3/02* (2006.01)
(52) U.S. Cl. .......... 446/369; 446/175; 446/385
(58) Field of Classification Search ........ 446/175, 446/484, 268, 369, 385, 387, 491
See application file for complete search history.

(56) References Cited

U.S. PATENT DOCUMENTS

| | | | |
|---|---|---|---|
| 5,009,626 A * | 4/1991 | Katz | 446/391 |
| 5,399,410 A | 3/1995 | Urase et al. | |
| 5,944,577 A | 8/1999 | Yanofsky et al. | |
| 6,155,189 A | 12/2000 | Walner | |
| 2001/0041494 A1 * | 11/2001 | Barad et al. | 446/268 |
| 2002/0022506 A1 * | 2/2002 | Rifkin | 463/1 |
| 2004/0038618 A1 * | 2/2004 | Atkins | 446/268 |
| 2005/0079791 A1 * | 4/2005 | Treibitz et al. | 446/391 |
| 2005/0087114 A1 | 4/2005 | Cho | |
| 2006/0234601 A1 * | 10/2006 | Weston | 446/268 |
| 2011/0117809 A1 * | 5/2011 | Bowar et al. | 446/369 |

OTHER PUBLICATIONS

PCT Search Report, PCT/US2009/051673, dated Sep. 17, 2009.
U.S. Appl. No. 12/410,282, filed Mar. 24, 2009, Komorous-King, Printable Pre-Sewn Stuffed Toy Composite Sheets.
"Zachi Cohen Mini Plush Toy," Plush Toy Blog, Jul. 7, 2008, (available at: http://plushtoyblog.com/tag/digital-print-plush-toys/).
"Personalized Figures," Andgor Toy, 2002, (available at: http://www.andgor.com/Personalized_Figures/personalized_figures.html).
"Print-n-Play Toys," Feb. 28, 2003, (available at: http://www.mcguirezone.com/goodies/toys.html).
International Preliminary Report on Patentability, PCT/US2009/051673, issued Feb. 3, 2011.

* cited by examiner

*Primary Examiner* — Dmitry Suhol
*Assistant Examiner* — Alex F. R. P. Rada, II
(74) *Attorney, Agent, or Firm* — Peters Verney, LLP

(57) ABSTRACT

Embodiments of the invention provide a composite sheet for creating a customized design. The composite sheet includes a first fabric portion, a second fabric portion, and a membrane portion disposed between the first fabric portion and the second fabric portion, where the first fabric portion is sewn with stitching to the second fabric portion. One advantage of the composite sheet and related systems and methods is that users can create customized designs conveniently on their own home printer.

22 Claims, 11 Drawing Sheets

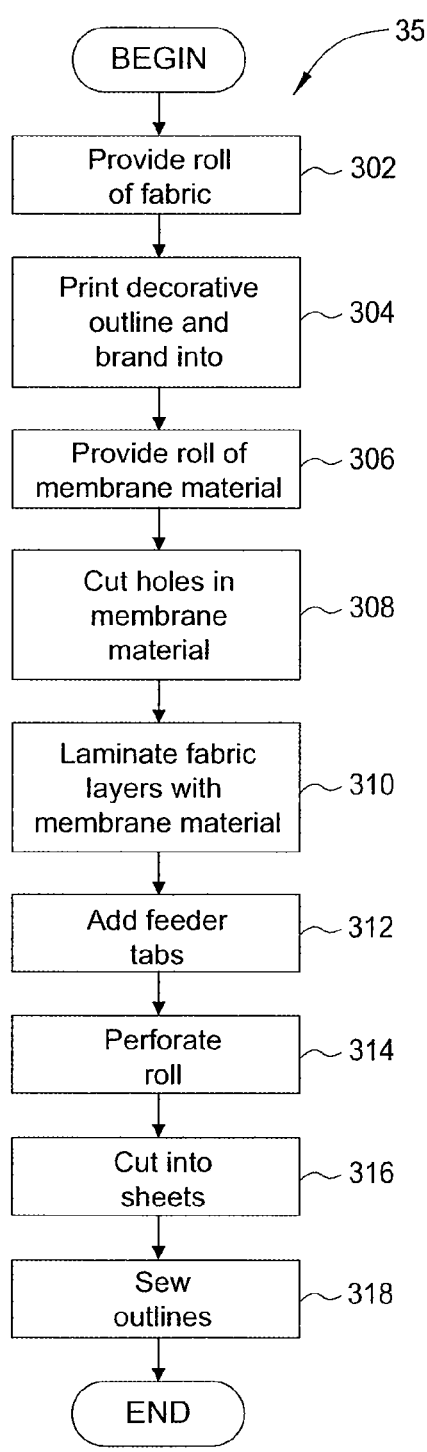
FIG. 3
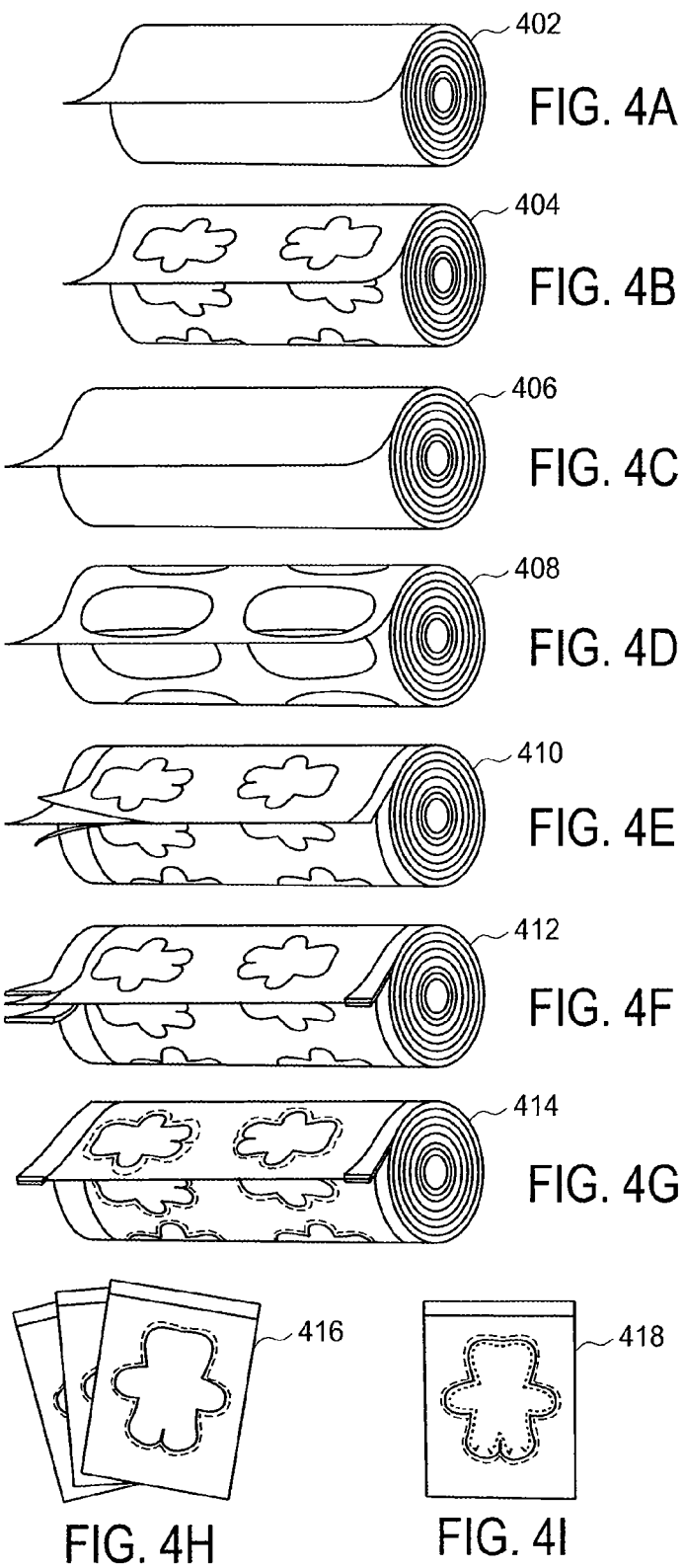
FIG. 4A
FIG. 4B
FIG. 4C
FIG. 4D
FIG. 4E
FIG. 4F
FIG. 4G
FIG. 4H
FIG. 4I

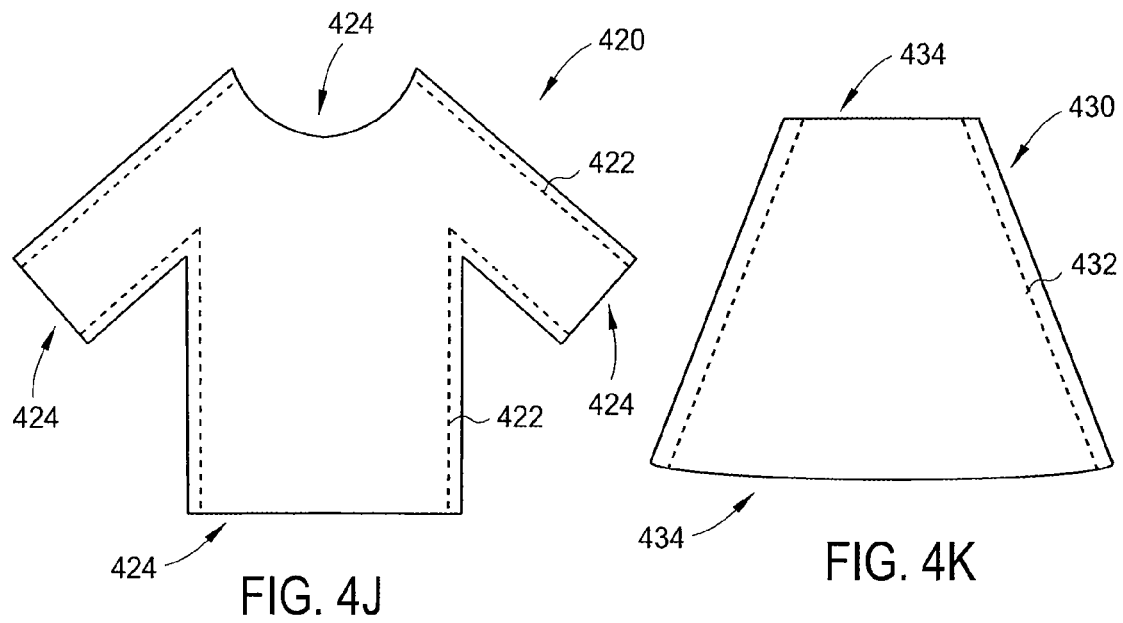
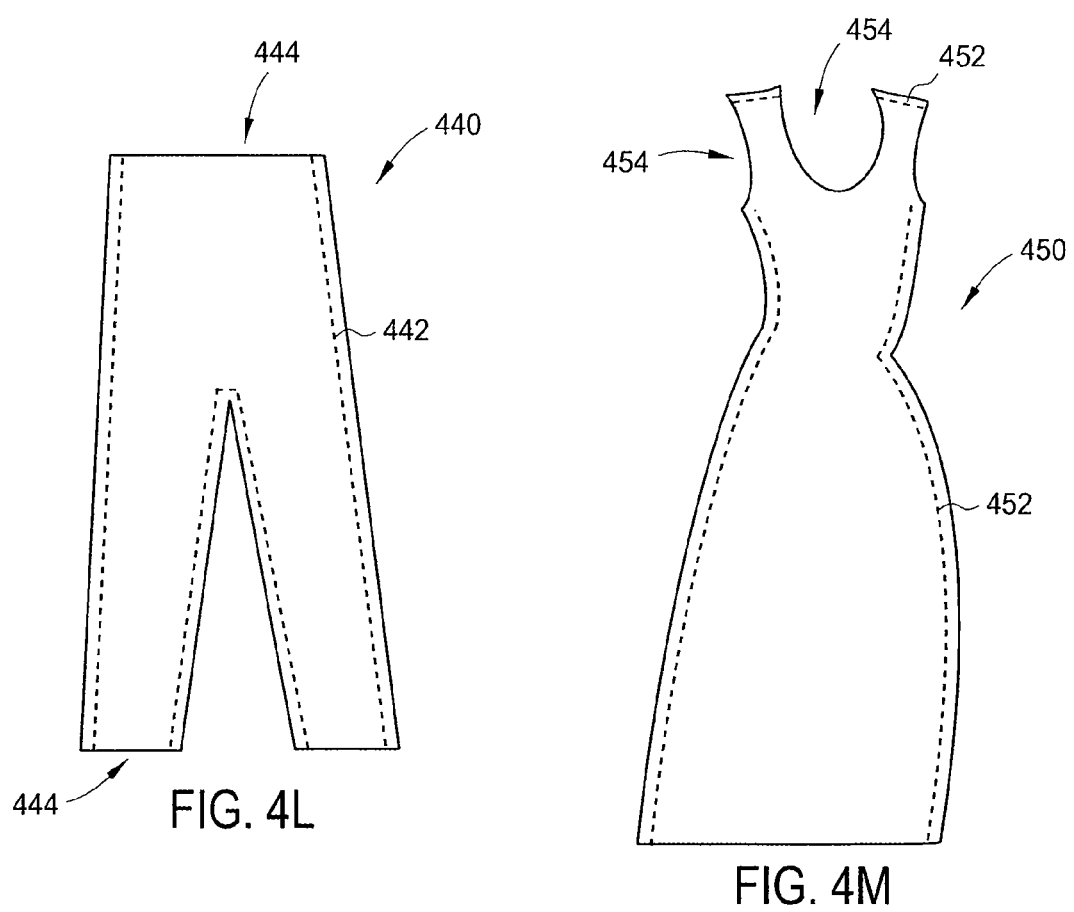

PRINTABLE PRE-SEWN STUFFED TOY COMPOSITE SHEETS

CROSS-REFERENCE TO RELATED APPLICATIONS

This application claims the priority benefit of provisional U.S. Patent Application Ser. No. 61/135,856, filed Jul. 24, 2008, and provisional U.S. Patent Application Ser. No. 61/194,593, filed Sep. 29, 2008. The subject matter of these applications is hereby incorporated by reference.

BACKGROUND OF THE INVENTION

1. Field of the Invention

The present invention relates generally to the field of stuffed toys and, more particularly, to the manufacture and use of pre-sewn stuffed toy composite sheets.

2. Description of the Related Art

As is known, a stuffed animal is toy animal sewn from cloth, plush, or other textiles that is stuffed with straw, beans, plastic pellets, cotton, synthetic fibers, or other similar materials. Stuffed animals are also known as "plush toys" based on the plush outer material used to make the toy. Stuffed animals are made in many different forms, including those resembling real animals, caricatures with emphasis on different features, or cartoon characters, among others. Stuffed animals are often used as comfort objects for children and adults alike.

One problem with conventional stuffed toys is that manufacturing and design of a customized stuffed toy is difficult and expensive. Physically creating a customized stuffed toy can take a long time and often requires a factory to re-tool certain machinery for production of a custom stuffed toy design.

A second problem with conventional stuffed toys is that if a stuffed toy is misplaced, there is no way to replicate the misplaced stuffed toy without finding the exact model in a retail store. The particular stuffed toy may be discontinued or difficult to locate, causing additional frustration.

Another problem with conventional stuffed toys is that the stuffed toys do not utilize advancements in technology to increase the playability of the stuffed toys. Additionally, yet another problem with existing stuffed toys is that they are too difficult for a child to make and/or customize at home.

Accordingly, there exists a need in the art for an improved stuffed toy that overcomes the problems with conventional approaches.

SUMMARY OF THE INVENTION

Embodiments of the invention provide a composite sheet for creating a customized design. The composite sheet includes a first fabric portion, a second fabric portion, and a membrane portion disposed between the first fabric portion and the second fabric portion, where the first fabric portion is sewn with stitching to the second fabric portion.

One advantage of the composite sheets and the related systems and methods disclosed herein is that users can create customized designs conveniently on their own home printer.

BRIEF DESCRIPTION OF THE DRAWINGS

FIG. 3 is flow diagram of method steps for manufacturing composite sheets, according to one embodiment of the invention.

FIG. 4A is a conceptual diagram illustrating a roll of fabric, according to one embodiment of the invention.

FIG. 4B is a conceptual diagram illustrating a roll of fabric with printed graphics, according to one embodiment of the invention.

FIG. 4C is a conceptual diagram illustrating a roll of membrane material, according to one embodiment of the invention.

FIG. 4D is a conceptual diagram illustrating a roll of membrane material with holes cut into the membrane material, according to one embodiment of the invention.

FIG. 4E is a conceptual diagram illustrating a roll having two layers of fabric laminated around the membrane material, according to one embodiment of the invention.

FIG. 4F is a conceptual diagram illustrating a roll with feeder tabs added to the roll, according to one embodiment of the invention.

FIG. 4G is a conceptual diagram that illustrates a perforated composite sheet roll, according to one embodiment of the invention.

FIG. 4H is a conceptual diagram illustrating composite sheets, according to one embodiment of the invention.

FIG. 4I is a conceptual diagram illustrating a sewn composite sheet, according to one embodiment of the invention.

FIGS. 4J-4M are conceptual diagrams illustrating clothing outlines included on a pre-sewn composite sheet, according to various embodiments of the invention.

DETAILED DESCRIPTION OF THE INVENTION

Embodiments of the invention relate to manufacturing and use of pre-sewn composite sheets that can be fed through a home printer to print customized graphics onto a stuffed toy shell. The stuffed toy shell can then be stuffed to create the three-dimensional (3D) stuffed toy. The composite sheets improve upon some inadequacies of conventional stuffed toys and stuffed toy kits currently available. As described in greater detail herein, embodiments of the invention allow a user to customize the graphics of the stuffed toy by creating a custom design utilizing computer software.

Manufacture of Composite Sheets

Figure 1A:
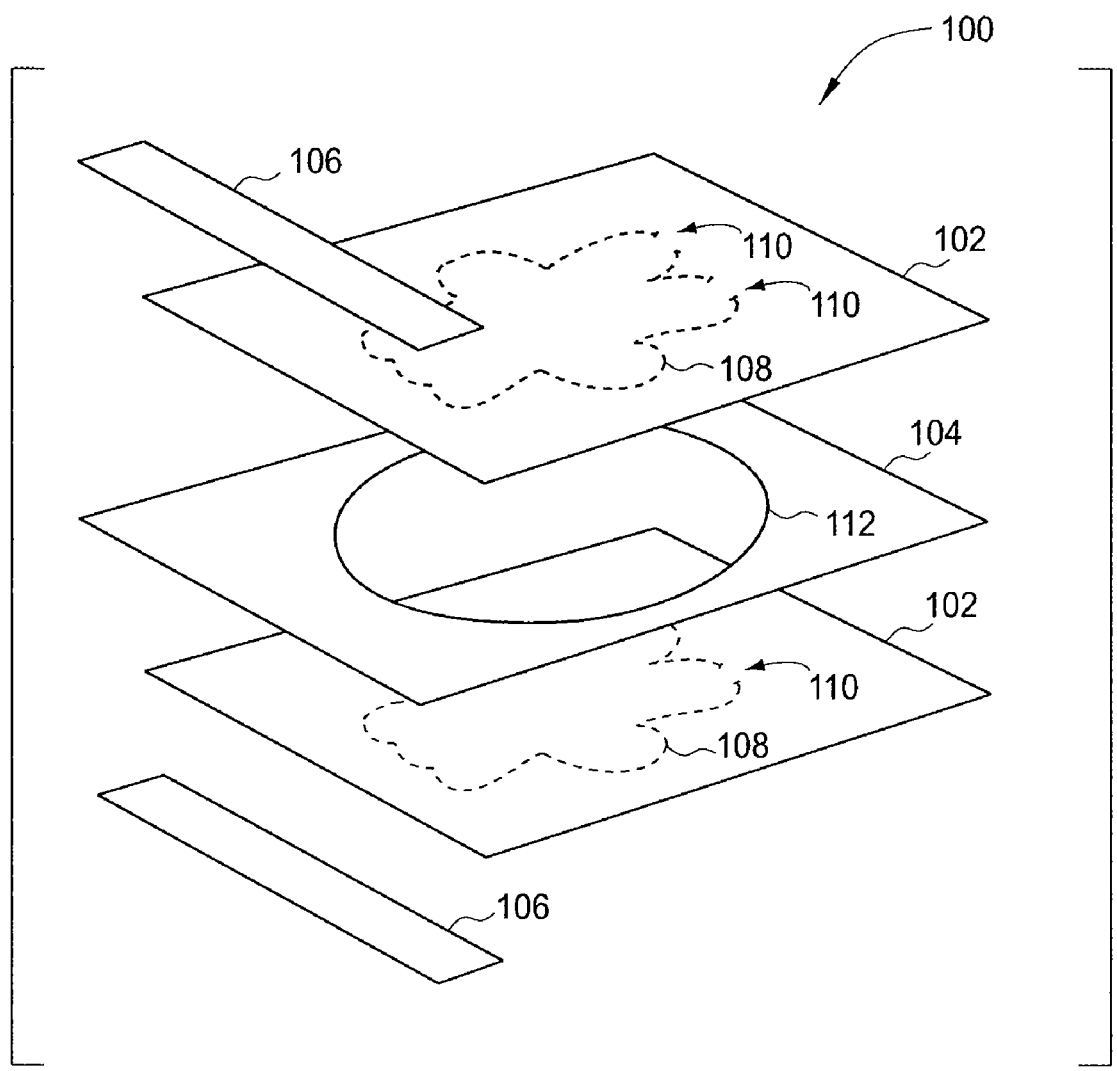
FIG. 1A illustrates an exploded view of a composite sheet used to create a stuffed toy, according to one embodiment of the invention.

FIG. 1A illustrates an exploded view of a composite sheet 100 used to create a stuffed toy, according to one embodiment of the invention. As shown, the composite sheet 100 includes two layers of fabric 102, a membrane 104, and one or more feeder tabs 106. In one embodiment, the layers of fabric 102 are made from a knit fabric. The knit fabric may allow for easier perforating during manufacturing. In alternative embodiments, any type of fabric may be used, including non-woven fabrics.

The membrane 104 is included in the composite sheet 100 to provide rigidity to the composite sheet 104. In various embodiments, the membrane 104 may be made from any material, including paper, plastic, a laminate material, an adhesive, or any other technically feasible material. As shown, the membrane 104 includes a hole 112 that covers an area at least as large as an outline 108 of the stuffed toy. In this fashion, when the different layers of the composite sheet 100 are combined with one another, the membrane 104 does not interfere with stuffing of the stuffed toy. The stuffing may comprise any technically feasible material, including cotton, a fiber fill, or any technically feasible material.

The composite sheet 100 may optionally include one or more feeder tabs 106 that provide a rigid and smooth surface to assist feeding the composite sheet 100 into an ink-jet printer. The feeder tabs 106 may be made from any technically feasible material, including paper, plastic, a laminate material, or any other technically feasible material.

In one embodiment, graphics (not shown) are printed onto the composite sheet 100. The graphics may include identification information that identifies the manufacturer, brand, or particular stuffed toy outline associated with the particular composite sheet 100. The graphics may also include instructions for the user on how to use the composite sheet 100 to create a customized stuffed toy.

The different layers of the composite sheet may be laminated to together to form the finished composite sheet. Additionally, the two layers of fabric 102 may be sewn together with stitching 108 that forms the outline of the stuffed toy. In one embodiment, the stitching 108 does not enclose the entirety of the outline of the stuffed toy. Rather, one or more openings 110 remain unstitched to allow the stuffed toy to be stuffed.

Figure 1B:
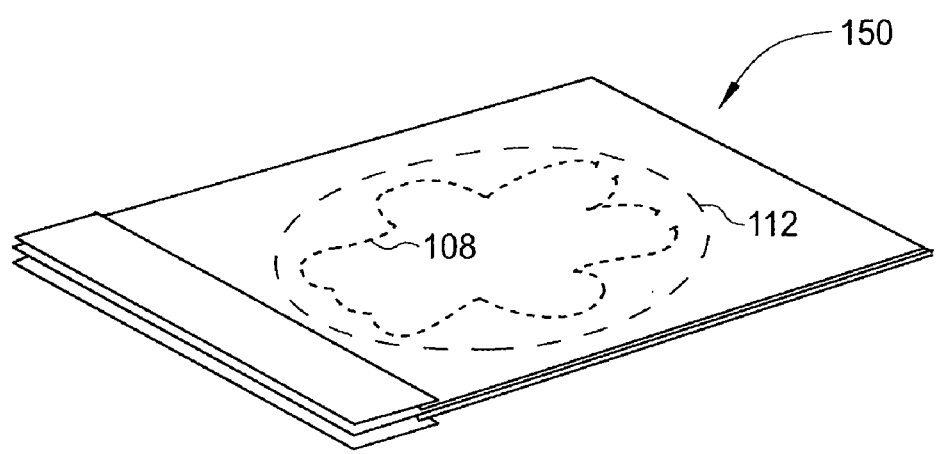
FIG. 1B illustrates a perspective view of the composite sheet, according one embodiment of the invention.

FIG. 1B illustrates a perspective view of a composite sheet 150, according one embodiment of the invention. The composite sheet 150 includes the same components as the composite sheet 100 shown in FIG. 1A. As shown, the hole 112 included in the membrane 104 covers an area that does not overlap with the outline 108 of the stuffed toy. A user may create customized graphics to print onto the composite sheet 100. Once the graphics are designed, the composite sheet can be fed into a printer that prints the customized design onto the composite sheet. The outline of the stuffed toy may then be removed from the composite sheet for stuffing. In some embodiments, the composite sheet 100 may be perforated to allow for easier removal of the stuffed toy outline.

Figure 2:
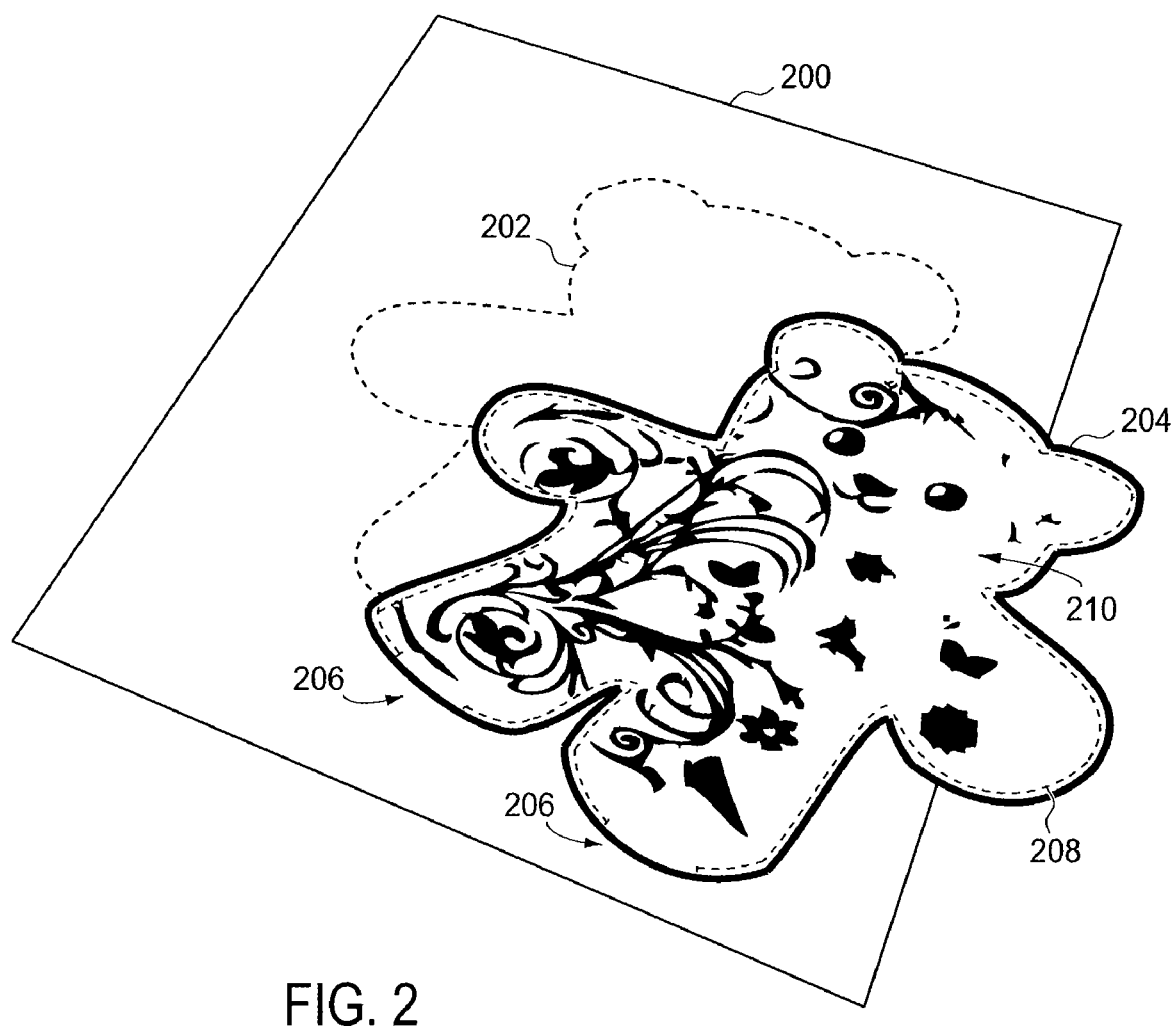
FIG. 2 illustrates a perspective view of a composite sheet after being customized by a user, according to one embodiment of the invention.

FIG. 2 illustrates a perspective view of a composite sheet 200 after being customized by a user, according to one embodiment of the invention. As shown, the composite sheet 200 includes a perforation 202 to allow for easier removal of the stuffed toy 204. Again, the stuffed toy 204 includes stitching 208 that forms the outline of the stuffed toy 204 and one or more openings 206 to allow the stuffed toy 204 to be stuffed.

In the embodiment shown in FIG. 2, the stuffed toy 204 has been customized by a user with custom graphics 210. As described in greater detail herein, the graphics 210 may be generated using specialized computer software and printed onto the composite sheet 200 using an ink-jet printer.

Once the stuffed toy 204 is stuffed with stuffing, the one or more opening 206 may be closed. Closing the one or more openings 206 may be performed using any technically feasible technique. Examples of techniques to close the one or more openings 206 include clipping the stuffed toy 204 into a base portion that covers the one or more openings 206, sealing the one or more openings 206 closed with an adhesive, hand-sewing the one or more openings 206, or any other technically feasible technique.

FIG. 3 is flow diagram of method steps for manufacturing composite sheets, according to one embodiment of the invention. Persons skilled in the art will understand that, even though the method 300 is described in conjunction with the composite sheets of FIGS. 1 and 2, any composite sheet made by performing the steps of the method 300 illustrated in FIG. 3, in any order, is within the scope of embodiments of the invention.

As shown, the method 300 begins at step 302, where a roll of fabric is provided. FIG. 4A is a conceptual diagram illustrating a roll of fabric 402, according to one embodiment of the invention. As described herein, the fabric may comprise any technically feasible material, including both woven and non-woven materials.

At step 304, a decorative outline, brand information, and other identifying information are printed on the fabric. FIG. 4B is a conceptual diagram illustrating a roll of fabric 404 with printed graphics, according to one embodiment of the invention. As understood by those having ordinary skill in the art, the graphics printed at step 304 are not customized graphics, but rather provide a "shell" within which a user or customer can ultimately provide custom graphics. In one embodiment, step 304 is omitted from the method 300.

At step 306, a roll of membrane material is provided. FIG. 4C is a conceptual diagram illustrating a roll of membrane material 406, according to one embodiment of the invention. As described herein, the membrane material may comprise any technically feasible material, including paper, plastic, a laminate material, or any other material.

At step 308, holes are cut into the membrane material. FIG. 4D is a conceptual diagram illustrating a roll of membrane material 408 with holes cut into the membrane material, according to one embodiment of the invention. In one embodiment, the holes are cut into the membrane material with a die cut machine. In alternative embodiments, the holes are cut by a laser cutter, a punch press, or any other technically feasible apparatus.

At step 310, two separate layers of fabric are laminated around a layer of membrane material. FIG. 4E is a conceptual diagram illustrating a roll 410 having two layers of fabric laminated around a layer the membrane material, according to one embodiment of the invention. As described, the holes are positioned and sized so that the outline of each stuffed toy is placed over one of the holes in the membrane material. In some embodiments, one or more wet or dry adhesives can be used to laminate the various layers so that one fabric layer does not adhere to the opposing fabric layer. For example, the adhesive may be applied to the membrane material only. In another example, a pre-cut sheet of adhesive sized to the particular shape of the composite sheet and the stuffed toy outline is applied to both sides of the membrane material.

At step 312, one or more feeder tabs are added to the roll to generate a composite sheet roll. FIG. 4F is a conceptual diagram illustrates a roll 412 with feeder tabs added, according to one embodiment of the invention. Again, as described, the one or more feeder tabs may be added to assist proper feeding of the composite sheet into ink-jet printers. In the embodiment shown in FIG. 4F, a feeder tab is added to each side (top and bottom) of the composite sheet, and also to both sides (left and right) of the roll 412, for a total of four feeder tabs per roll. In alternative embodiments, a feeder tab is only added to one side (either top side or bottom side) of the composite sheet, for a total of two feeder tabs per roll. In still further embodiments, no feeder tab is added to the roll 412 and step 312 is omitted.

At step 314, the composite sheet roll is perforated at the outline of each stuffed toy to provide easy removal of the stuffed toy from the composite sheet roll and/or from a composite sheet produced at the end of the method 300. FIG. 4G is a conceptual diagram that illustrates a perforated composite sheet roll 414, according to one embodiment of the invention. In one embodiment, the perforation step can be performed following any step of the method 300, including both before and after step 316 of cutting the composite sheet roll into separate composite sheets. In some embodiments, step 314 is omitted and the composite sheet roll is not perforated. In embodiments where the composite sheet is not perforated, users can cut the stuffed toy out of the composite sheet with conventional scissors, a knife, or any other suitable cutting tool to remove the shape of the stuffed toy from the composite sheet.

At step 316, the composite sheet roll is cut into separate composite sheets. FIG. 4H is a conceptual diagram that illustrates composite sheets 416, according to one embodiment of the invention. At step 318, each composite sheet is sewn to provide to shape of the stuffed toy that can be made using that particular composite sheet. FIG. 4I is a conceptual diagram illustrating a sewn composite sheet 418, according to one embodiment of the invention. As shown, the stitching does not completely surround the outline of the stuffed toy and one or more openings are provided to allow the stuffed toy to be stuffed. In an alternative embodiment, at step 318, instead of sewing the composite sheets, the shape of the stuffed toy is created by heat-sealing the composite sheet roll to generate the outline of the stuffed toy. In some embodiments, each composite sheet may include stitching that provides the outline for one, two, or any number of stuffed toys.

Once the stuffed toy is filled with stuffing, the one or more openings can be closed in any technically feasible manner. For example, the composite sheet may be manufactured to include a dry adhesive strip at the opening to allow the user to seal the stuffing opening of the stuffed toy.

Alternative embodiments provide for manufacturing composite sheets with folded fabric parts to allow for larger unfolding parts. In still further embodiments, the fabric used to manufacture the composite sheets provides enough rigidity to be properly fed into a printer, and the membrane material is not included in the composite sheet. For example, a special coating may be applied to the fabric layers to add rigidity to the composite sheet. A polyurethane coating or any other suitable material can be used to add rigidity to the fabric layers and can be added to either side of the fabric.

In yet further embodiments, a printable portion of the composite sheet is coated with a product or solution designed to aid in the reception of ink from an ink-jet printer. In some embodiments, the composite sheets are manufactured to have a size comprising a standard paper size, including letter size (8.5 inches×11.0 inches), A4, or any other standard paper size. In alternative embodiments, the composite sheets have a size that is not equivalent to a standard paper size.

As understood by those having ordinary skill in the art, the steps of the method 300 are not limited to being performed in the order presented, and may be performed in a different order.

In still further embodiments of the invention, the composite sheet may include outlines that define the shape of clothing to be worn by dolls or children. Similar to the composite sheets described above in FIGS. 1A-2 used for creating a customized stuffed toy, alternative embodiments of the composite sheet may be used for creating customized clothing. The composite sheet used to create customized clothing may also include two layers of fabric, a membrane, one or more feeder tabs, and/or any of the alternatives described above in relation to composite sheets used for creating a customized stuffed toy. The outline of the clothing may be perforated on the composite sheet and portions of the outline may be pre-sewn onto the composite sheet. In one embodiment, when used to make clothing, the composite sheet is not stuffed with stuffing.

According to various embodiments, the user may design and print a customized design onto one side or both sides of the fabric defined by the clothing outline. In one embodiment, one composite sheet may include a single outline of clothing. For example, when the clothes are designed for infants or children, then a single clothing outline may be included on the composite sheet. In alternative embodiments, one composite sheet may include multiple clothing outlines. For example, when the clothes are designed for dolls, several clothing outlines may fit onto a single composite sheet.

In some embodiments, the customized clothing outline is not pre-sewn in certain portions to allow for a head, arms, and/or legs to be inserted into the customized clothing. In some embodiments, the perforated edges of the fabric that are not pre-sewn may be coated with an anti-fray coating. In alternative embodiments, the fabric of the composite sheet may be made from a fabric that does not fray. In still further embodiments, the fabric may be stretchable to accommodate the curves of a doll or person.

In some embodiments, portions of the customized clothing outline may have openings, slits, or seams to enable easy dressing. For example, a slit may go partway down the back of a skirt to allow the skirt to be placed over the hips of a doll. In still further embodiments, the fasteners may be added (e.g., adhesive, tape, hook-and-loop, button, pins, etc.) to close the openings, the slits, and/or the seams.

FIG. 4J is a conceptual diagram illustrating a shirt outline 420 included on a pre-sewn composite sheet, according to one embodiment of the invention. As shown, the shirt outline 420 includes pre-sewn portions 422 and other portions 424 that are not pre-sewn. FIG. 4K is a conceptual diagram illustrating a skirt outline 430 included on a pre-sewn composite sheet, according to one embodiment of the invention. As shown, the skirt outline 430 includes pre-sewn portions 432 and other portions 434 that are not pre-sewn. FIG. 4L is a conceptual diagram illustrating a pants outline 440 included on a pre-sewn composite sheet, according to one embodiment of the invention. As shown, the pants outline 440 includes pre-sewn portions 442 and other portions 444 that are not pre-sewn. FIG. 4M is a conceptual diagram illustrating a dress outline 450 included on a pre-sewn composite sheet, according to one embodiment of the invention. As shown, the dress outline 450 includes pre-sewn portions 452 and other portions 454 that are not pre-sewn. As persons having ordinary skill in the art should understand, the designs illustrated in FIGS. 4J-4M are merely exemplary, and many other clothing outlines are within the scope of embodiments of the invention, including a vest design, a scarf design, socks design, and the like.

Computer System Overview

Figure 5:
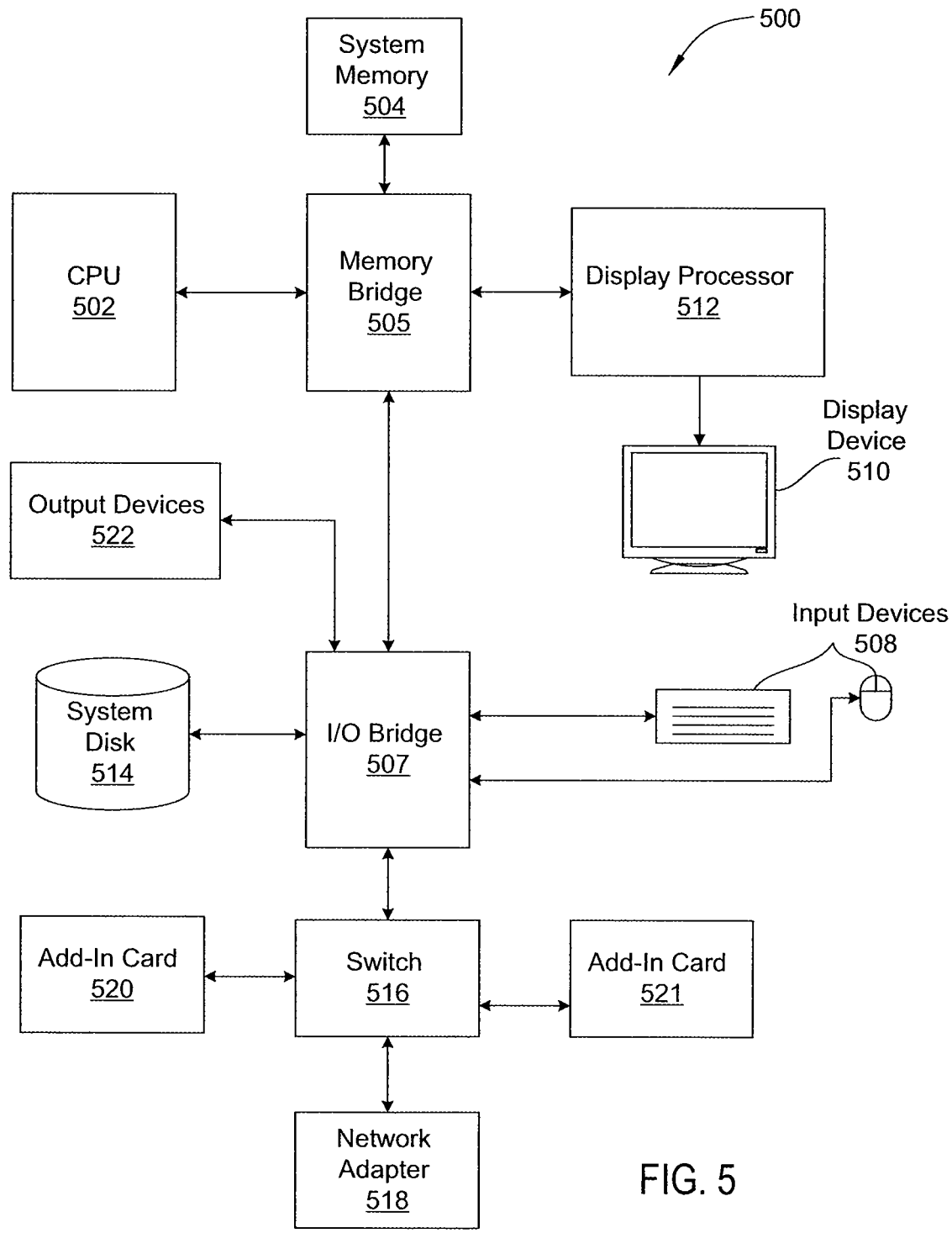
FIG. 5 is a block diagram of a system configured to implement one or more aspects of the present invention.

As described herein, embodiments of the invention provide a computer-implemented method for creating a customized design for a stuffed toy. FIG. 5 is a block diagram of a computer system 500 configured to implement one or more aspects of the present invention. The computer system 500 may be a personal computer, video game console, personal digital assistant, rendering engine, or any other device suitable for practicing one or more embodiments of the present invention.

As shown, the computer system 500 includes a central processing unit (CPU) 502 and a system memory 504 communicating via a bus path that may include a memory bridge 505. CPU 502 includes one or more processing cores, and, in operation, CPU 502 is the master processor of computer system 500, controlling and coordinating operations of other system components. System memory 504 stores software applications and data for use by CPU 502. CPU 502 runs software applications and optionally an operating system. Memory bridge 505, which may be, e.g., a Northbridge chip, is connected via a bus or other communication path (e.g., a HyperTransport link) to an I/O (input/output) bridge 507. I/O bridge 507, which may be, e.g., a Southbridge chip, receives user input from one or more user input devices 508 (e.g., keyboard, mouse, joystick, digitizer tablets, touch pads, touch screens, still or video cameras, a scanner, motion sensors, and/or microphones) and forwards the input to CPU 502 via memory bridge 505. The I/O bridge 507 is also coupled to one or more output devices 522, which may include a printer, a scanner, a speaker, a digital video camera, or another computer system, among others.

A display processor 512 is coupled to memory bridge 505 via a bus or other communication path (e.g., a PCI Express, Accelerated Graphics Port, or HyperTransport link); in one embodiment display processor 512 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 504.

Display processor 512 periodically delivers pixels to a display device 510 (e.g., a screen or conventional CRT, plasma, OLED, SED or LCD based monitor or television).

A system disk 514 is also connected to I/O bridge 507 and may be configured to store content and applications and data for use by CPU 502 and display processor 512. System disk 514 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 516 provides connections between I/O bridge 507 and other components such as a network adapter 518 and various add-in cards 520 and 521. Network adapter 518 allows computer system 500 to communicate with other systems via an electronic communications network, and may include wired or wireless communication over local area networks and wide area networks such as the Internet.

Other components (not shown), including USB or other port connections may also be connected to I/O bridge 507. For example, an audio processor may be used to generate analog or digital audio output from instructions and/or data provided by CPU 502, system memory 504, or system disk 514. Communication paths interconnecting the various components in FIG. 5 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 512 incorporates circuitry optimized for graphics and video processing, including, for example, video output circuitry, and constitutes a graphics processing unit (GPU). In another embodiment, display processor 512 incorporates circuitry optimized for general purpose processing. In yet another embodiment, display processor 512 may be integrated with one or more other system elements, such as the memory bridge 505, CPU 502, and I/O bridge 507 to form a system on chip (SoC). In still further embodiments, display processor 512 is omitted and software executed by CPU 502 performs the functions of display processor 512.

Pixel data can be provided to display processor 512 directly from CPU 502. In some embodiments of the present invention, instructions and/or data representing a design of a customized stuffed toy are provided to a render farm or a set of server computers, each similar to computer system 500, via network adapter 518 or system disk 514. The render farm generates one or more rendered images of the scene using the provided instructions and/or data. These rendered images may be stored on computer-readable media in a digital format and optionally returned to computer system 500 for display.

Alternatively, CPU 502 provides display processor 512 with data and/or instructions defining the desired output images, from which display processor 512 generates the pixel data of one or more output images, including characterizing and/or adjusting the offset between stereo image pairs. The data and/or instructions defining the desired output images can be stored in system memory 504 or graphics memory within display processor 512. In an embodiment, display processor 512 includes 3D rendering capabilities for generating pixel data for output images from instructions and data defining the geometry, lighting shading, texturing, motion, and/or camera parameters for a scene. Display processor 512 can further include one or more programmable execution units capable of executing shader programs, tone mapping programs, and the like.

CPU 502, render farm, and/or display processor 512 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the computer system 500 shown herein is illustrative and that variations and modifications are possible. The connection topology, including the number and arrangement of bridges, may be modified as desired. For instance, in some embodiments, system memory 504 is connected to CPU 502 directly rather than through a bridge, and other devices communicate with system memory 504 via memory bridge 505 and CPU 502. In other alternative topologies, display processor 512 is connected to I/O bridge 507 or directly to CPU 502, rather than to memory bridge 505. In still other embodiments, I/O bridge 507 and memory bridge 505 might be integrated into a single chip. The particular components shown herein are optional; for instance, any number of add-in cards or peripheral devices might be supported. In some embodiments, switch 516 is eliminated, and network adapter 518 and add-in cards 520, 521 connect directly to I/O bridge 507.

Customized Stuffed Toy Design and Interaction

As described herein, embodiments of the invention relate to stuffed toys and a system and method for customization of a stuffed toy. A stuffed toy kit is provided that improves upon some of the inadequacies of conventional stuffed toys and stuffed toy kits currently available. Embodiments of the invention allow the user to customize the graphics of the stuffed toy by creating a design utilizing computer software. The design is then printed onto a composite sheet using a conventional ink-jet printer or other type of printing device. Additionally, in some embodiments, the stuffed toy has the ability to interact with a physical play stand environment using radio-frequency identification (RFID) technology. The physical play stand may be coupled to a computer system and may interact with a corresponding customized virtual environment displayed on the computer system. The virtual environment on the computer system may provide additional playability through virtual games.

Figure 6:
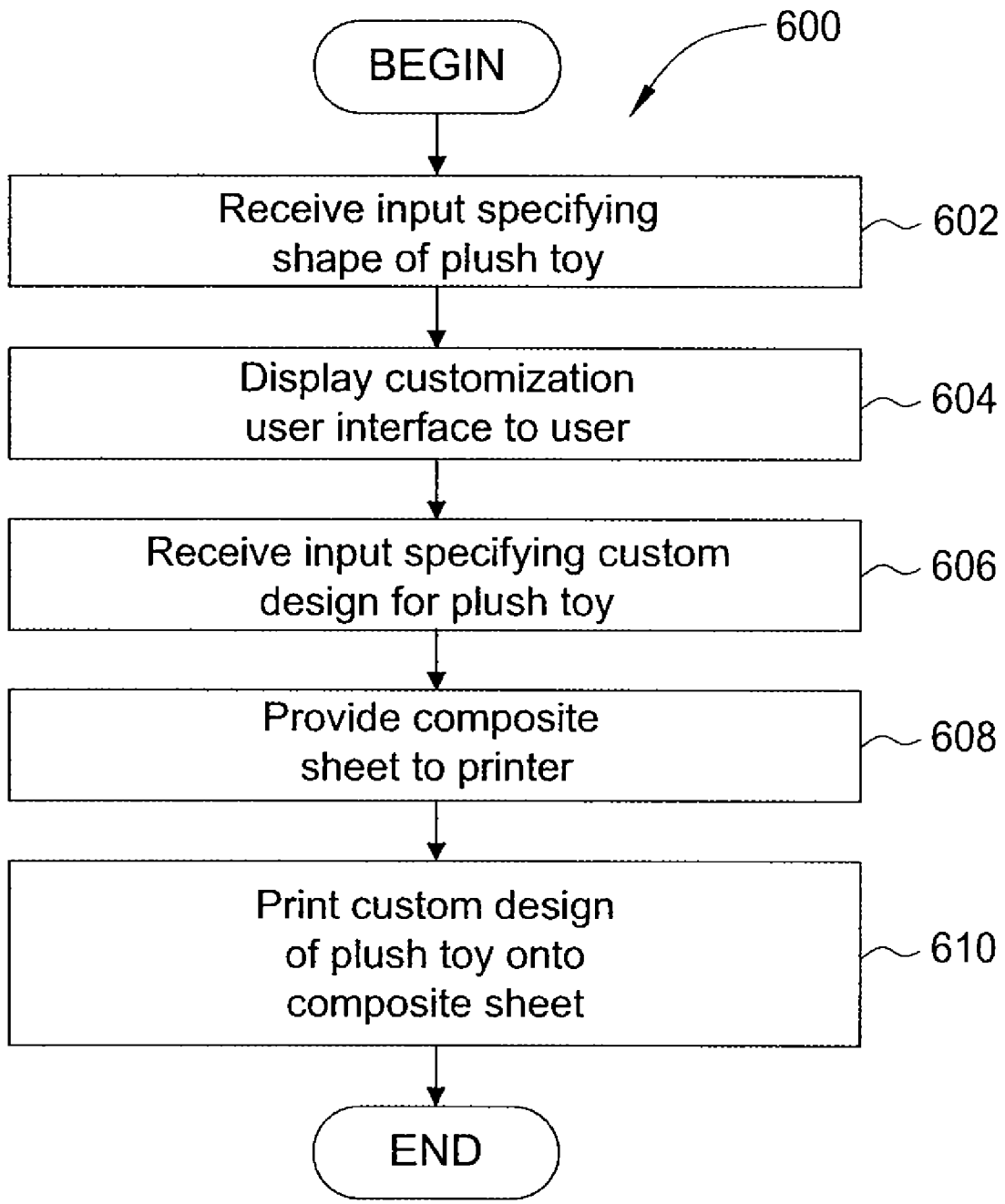
FIG. 6 is a flow diagram of method steps for designing a customized stuffed toy, according to one embodiment of the invention.

FIG. 6 is a flow diagram of method steps for designing a customized stuffed toy, according to one embodiment of the invention. Persons skilled in the art will understand that, even though the method 600 is described in conjunction with the systems of FIG. 5, any system configured to perform the method steps, in any order, is within the scope of the present invention.

As shown, the method 600 begins at step 602, where customization software executing on the computer system 500 receives input specifying a shape of the stuffed toy to be created. The input may be user input. For example, if a user desires to create a stuffed toy shaped like a bear, then the user may select a bear shape from a list of available shapes. Additionally, the user may manually input a serial number or code associated with the shape of the stuffed toy. The serial number or code may be pre-printed on the composite sheet that the user wishes to use to create the stuffed toy. In alternative embodiments, the input may be a computerized input such as scanning a bar code that identifies the shape of the stuffed toy to be created.

Figure 7:
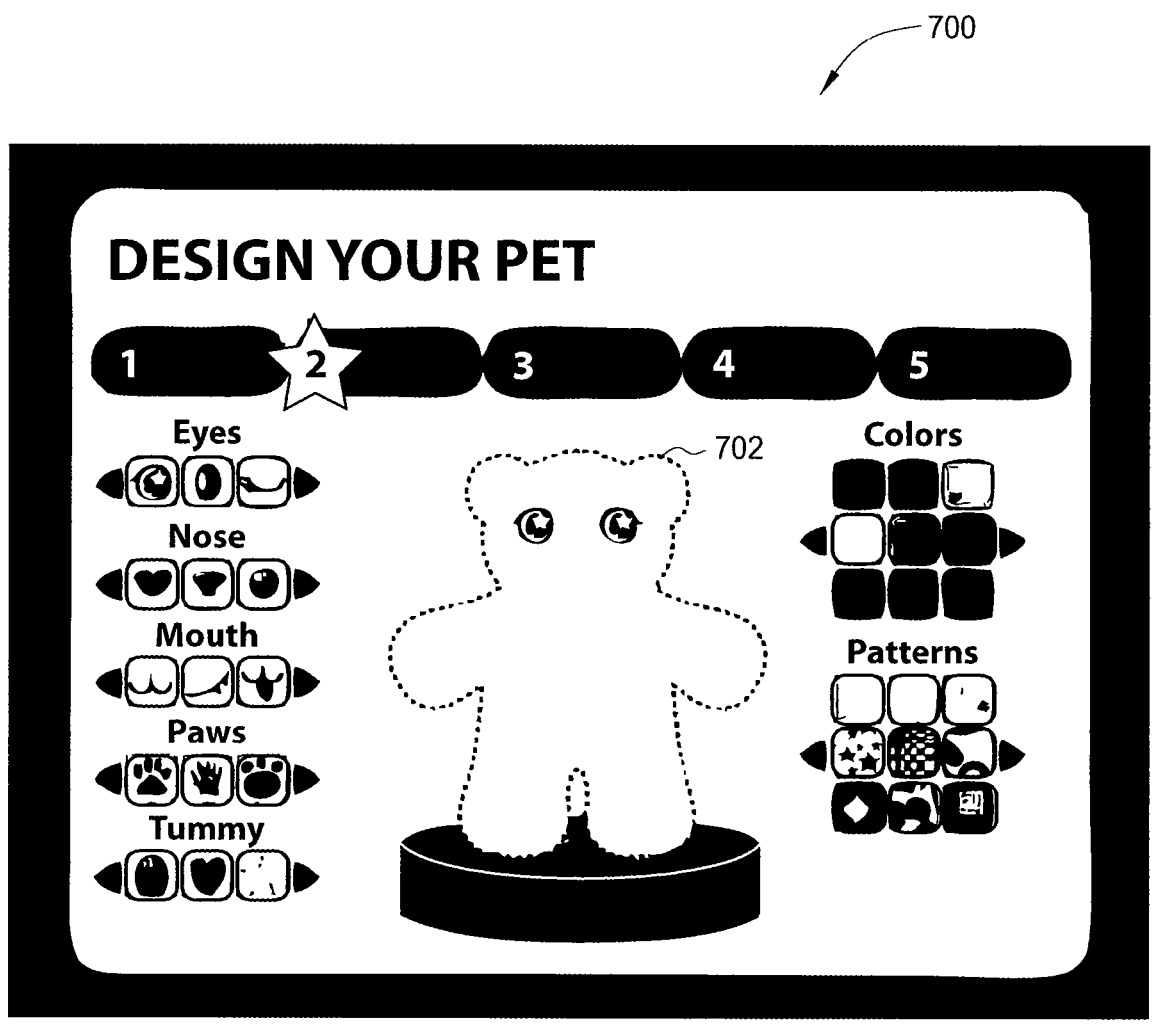
FIG. 7 is a screen shot illustrating a user interface for customizing a design of a stuffed toy, according to one embodiment of the invention.

At step 604, the customization software displays a user interface for customizing the design of the stuffed toy to the user. The user interface may be displayed on the display device 510 of the computer system 500. FIG. 7 is a screen shot illustrating a user interface 700 for customizing a design of a stuffed toy, according to one embodiment of the invention. As shown, the user interface 700 includes a template 702 in the shape of a bear. Additionally, the user interface 700 includes a plurality of customizable options, including eyes, nose, mouth, paws, tummy, colors, and patterns. As one having ordinary skill in the art would understand, the options shown in the user interface 700 are merely examples, and any of the options shown may be omitted and other options not shown may be included in the user interface 700.

Referring back to FIG. 6, at step 606, the customization software receives input specifying a custom design for the stuffed toy. In one embodiment, the input is user input that is received via input devices 508, such as a keyboard and mouse. The user input may specify one or more of the options provided in the user interface 700 shown in FIG. 7. For example, the user input may specify one or more pre-designed patterns, facial features, or colors. In alternative embodiments, the user can upload graphics or pictures to the computer system 500, or may draw graphics that can be incorporated into the custom design.

At step 608, a composite sheet is provided to a printer coupled to the computer system 500. For example, the composite sheet may comprise the composite sheet described in FIGS. 1 and 2. In one embodiment, the pre-sewn shape included in the pre-sewn sheet corresponds to the template 702 shown in the user interface 700 in FIG. 7. At step 610, an ink-jet printer coupled to the computer system prints the custom design onto the composite sheet. The ink-jet printer emits ink onto the composite sheet to form the custom design displayed on the screen.

In some embodiments, the composite sheet may be fed through the ink-jet printer a second time to print a custom design onto the opposite side of the composite sheet. Once the printer finishes printing on one side or on both sides of the pattern, the user can remove the silhouette of the stuffed toy from the composite sheet. Since the silhouette is pre-sewn through both sides of the composite sheet, the silhouette can be filled with stuffing to give the form volume. The user may then perform any of the techniques described above to close the opening where the stuffing was inserted, such as applying a clip-on base to the stuffed toy. In one embodiment, the clip-on base may comprise "shoes" that the stuffed toy wears.

Figure 8A:
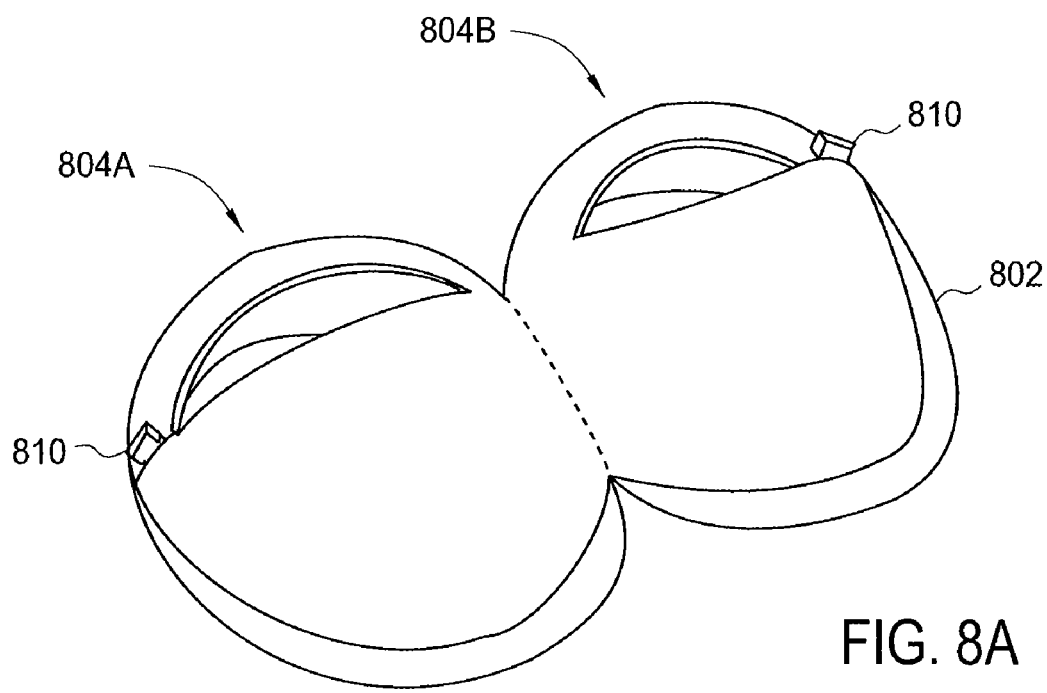
FIGS. 8A-8B illustrate perspective views of clip-on bases that can be added to the stuffed toy, according to various embodiments of the invention.
Figure 8B:
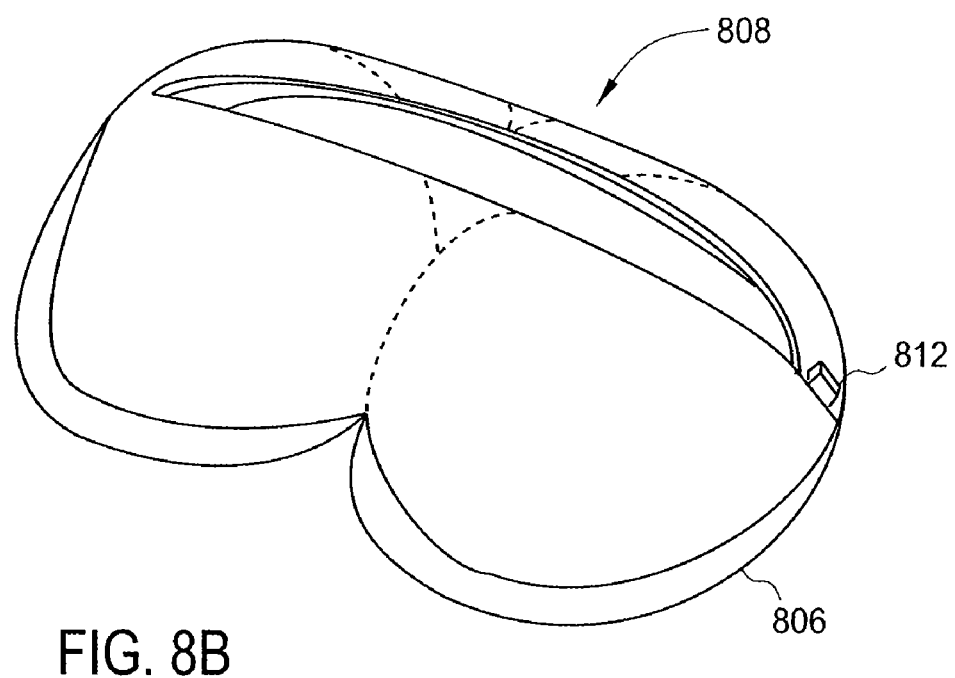

FIGS. 8A-8B illustrate perspective views of a clip-on bases 802, 806 that can be added to the stuffed toy, according to various embodiments of the invention. As in shown in FIG. 8A, in one embodiment, the clip-on base 802 includes two openings 804A, 804B, where each opening is configured to accept a different body part of the stuffed toy. For example, each leg of the stuffed toy may be inserted into a different opening 804A, 804B. The clip-on base 802 may also include one or more locking mechanisms 810 to keep the stuffed toy from slipping out of the clip-on base 802. In an alternative embodiment, as shown in FIG. 8B, the clip-on base 806 may include a single opening 808. In these embodiments, a bottom portion of the stuffed toy can be inserted into the clip-on base. The clip-on base 806 may also include a locking mechanism 812 to keep the stuffed toy from slipping out of the clip-on base 806.

Figure 9:
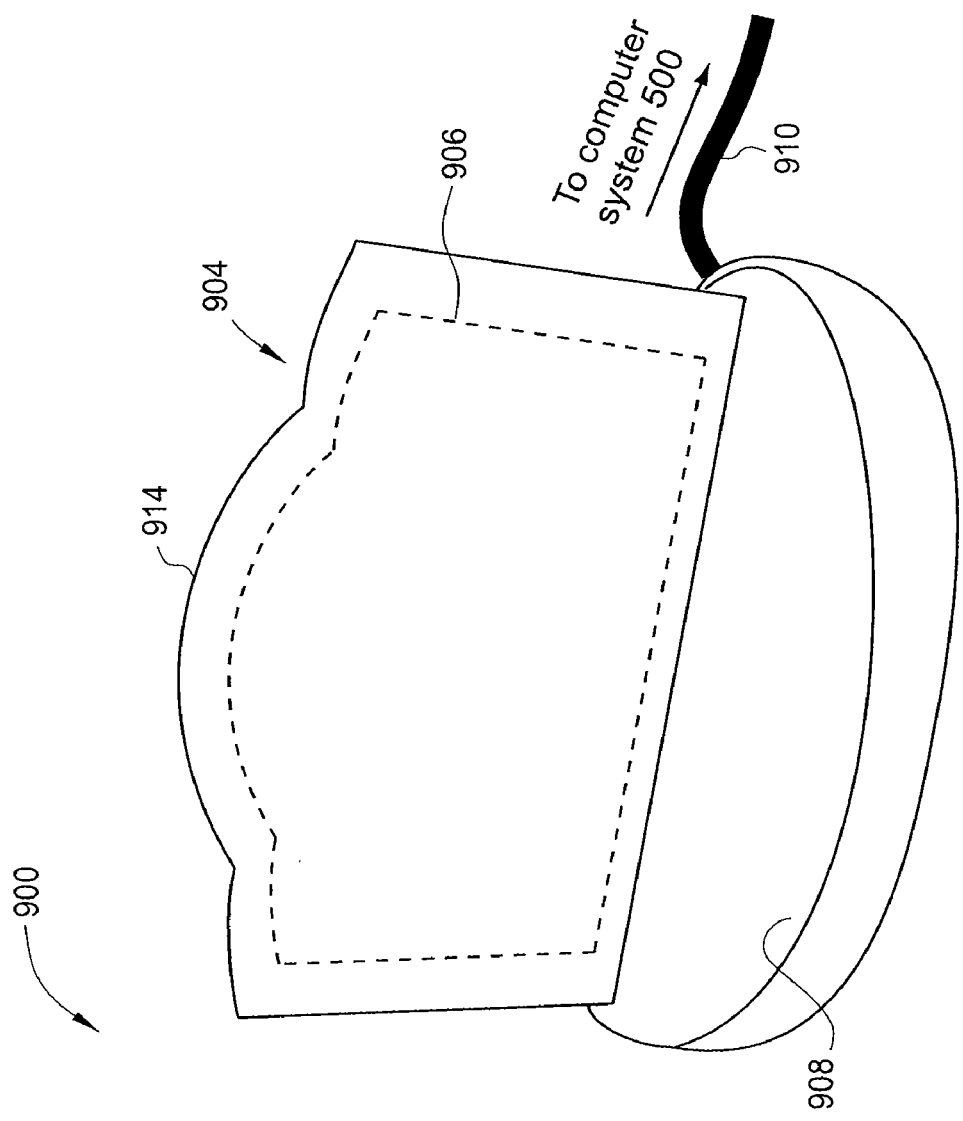
FIG. 9 is a conceptual diagram that illustrates a system involving an RFID-enabled stuffed toy, according to one embodiment of the invention.
Figure 9:
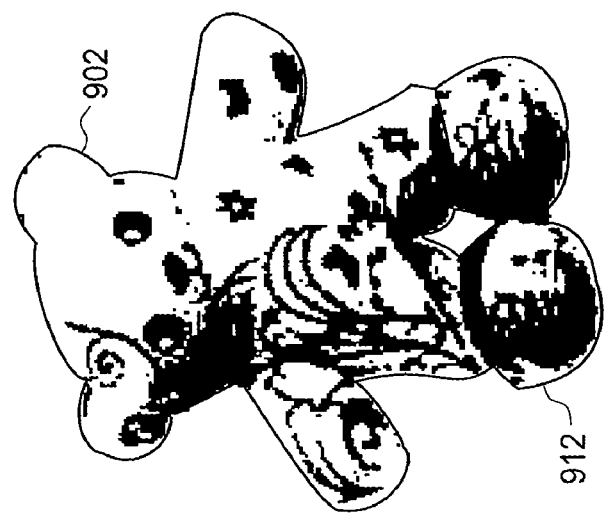

As described above, in some embodiments, the printable stuffed toy kit includes RFID-enabled components. FIG. 9 is a conceptual diagram that illustrates a system 900 involving an RFID-enabled stuffed toy 902, according to one embodiment of the invention. As shown, the system 900 includes the stuffed toy 902 and a stage 904. The stuffed toy 902 is stuffed with stuffing and is clipped into a clip-on base 912. In one embodiment, the clip-on base 912 includes an RFID tag that uniquely identifies the stuffed toy 902. In alternative embodiments, the RFID tag is included in the fabric of the stuffed toy 902. Most RFID tags contain at least one integrated circuit for storing and processing information, modulating and demodulating a radio frequency (RF) signal, and other specialized functions, and an antenna for receiving and transmitting the signal. Chipless RFID allows for discrete identification of tags without an integrated circuit, thereby allowing tags to be printed directly onto the composite sheets, potentially at a lower cost than traditional RFID tags.

Figure 10:
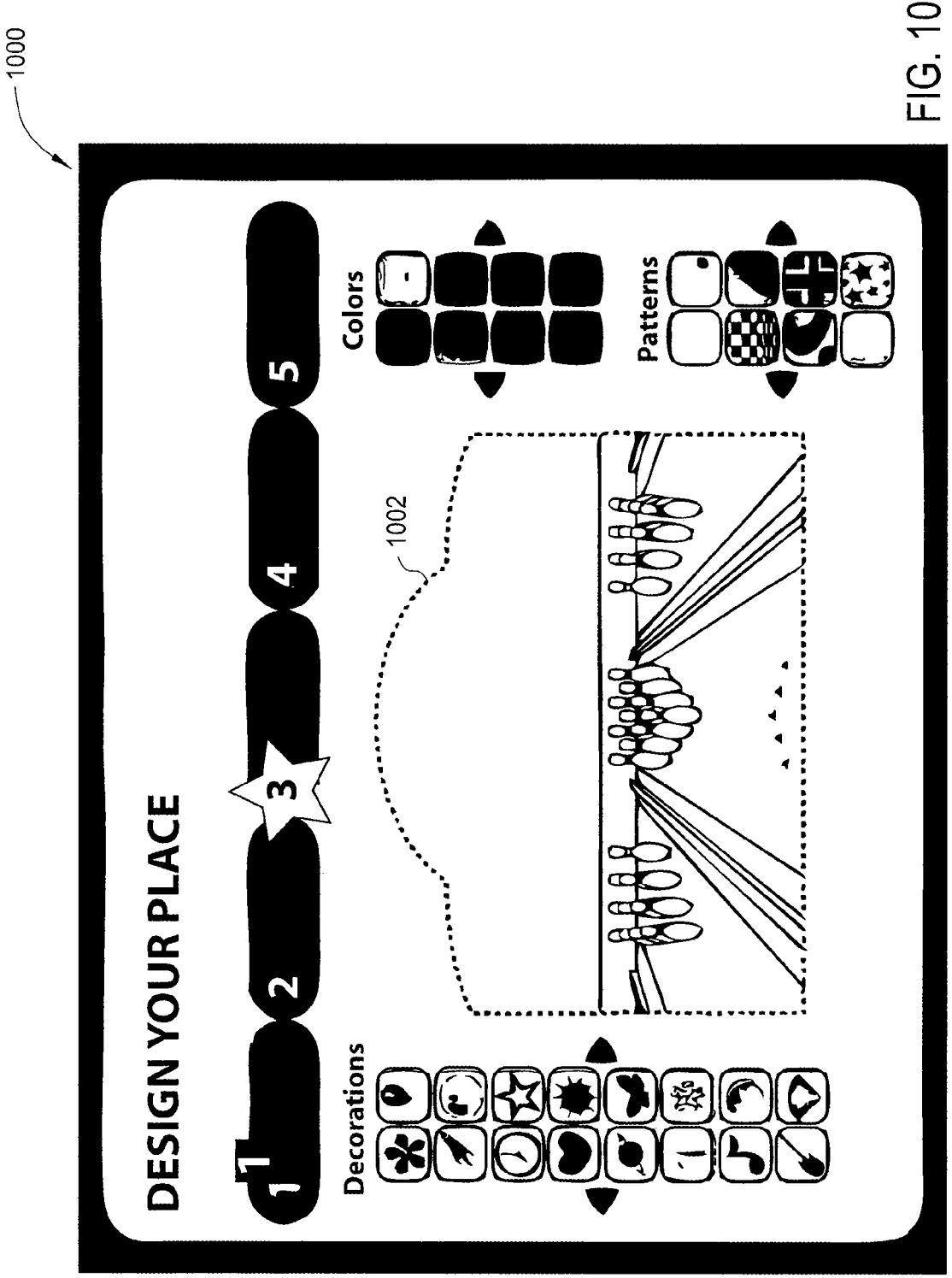
FIG. 10 is a screen shot illustrating a user interface for customizing a design of a sticker that may be placed on a backdrop, according to one embodiment of the invention.

The stage 904 includes a backdrop 914, a base portion 908, and a data cable 910 that can be coupled to the computer system 500 shown in FIG. 5. In one embodiment, the backdrop 914 is made from cardstock, is removable from the base portion 908, and may include an RFID tag that uniquely identifies the backdrop 914. For example, the backdrop 914 may be embedded with an RFID tag or may be made of RFID-enabled printable cardstock. In some embodiments, the cardstock may include a coating to more easily accept ink. Additionally, the backdrop 914 may include a customizable area 906 upon which a user can place customized stickers. FIG. 10 is a screen shot illustrating a user interface 1000 for customizing a design of a sticker that may be placed on the backdrop, according to one embodiment of the invention. As shown, a template 1002 is displayed in the user interface 1000. The user can select various options, including, for example, decorations, colors, and patterns, to create a customized backdrop design. A blank sticker sheet with an appropriately-sized sticker may be placed in the printer included in the computer system 500, and the customized backdrop can be printed onto the sticker sheet. In one embodiment, the size of the template 1002 is configured to fit within the customizable area 906 of the backdrop 914 shown in FIG. 9.

The data cable 910, in one embodiment, may comprise a Universal Serial Bus (USB) connector or any other type of data connector. In one embodiment, the printable cardstock backdrop 914 has a passive RFID tag that can be read through inductive power received via the data cable 910 and the base portion 908.

The base portion 908 may include an RFID reader configured to read the RFID tag included in the stuffed toy 902 and/or the RFID tag included in the backdrop 914 and to communicate data to the computer system 500 via the data cable 910. In one embodiment, as described above, the clip-on base 912 of stuffed toy 902 is designed to look like "shoes" for the stuffed toy 902 and includes an RFID tag embedded in the clip-on base 912.

Additionally, the user can create custom decals to place on the stuffed toy 902, on the clip-on base 912, or anywhere that the user desires. Creating the custom decals may be performed using a similar technique to the techniques used to create the customized stuffed toy 902 and the customized backdrop 914.

Once a user has completed creating the customized stuffed toy 902, backdrops 914, and decals, the backdrop 914 can be placed into the base portion 908 of the stage 904, and the stuffed toy 902 can be placed on the base portion 908. The stage 904 can be plugged into the USB port of a computer to begin communication between the stage and the computer. The RFID reader included in the stage 904 is configured to read the RFID tag of the stuffed toy 902 and the RFID tag of the backdrop 914, and to transmit this information to the computer system 500 via the data cable 910. A virtual version of the stuffed toy and a virtual version of the backdrop may then be displayed on the display device and may include the customizations that the user created.

Figure 11:
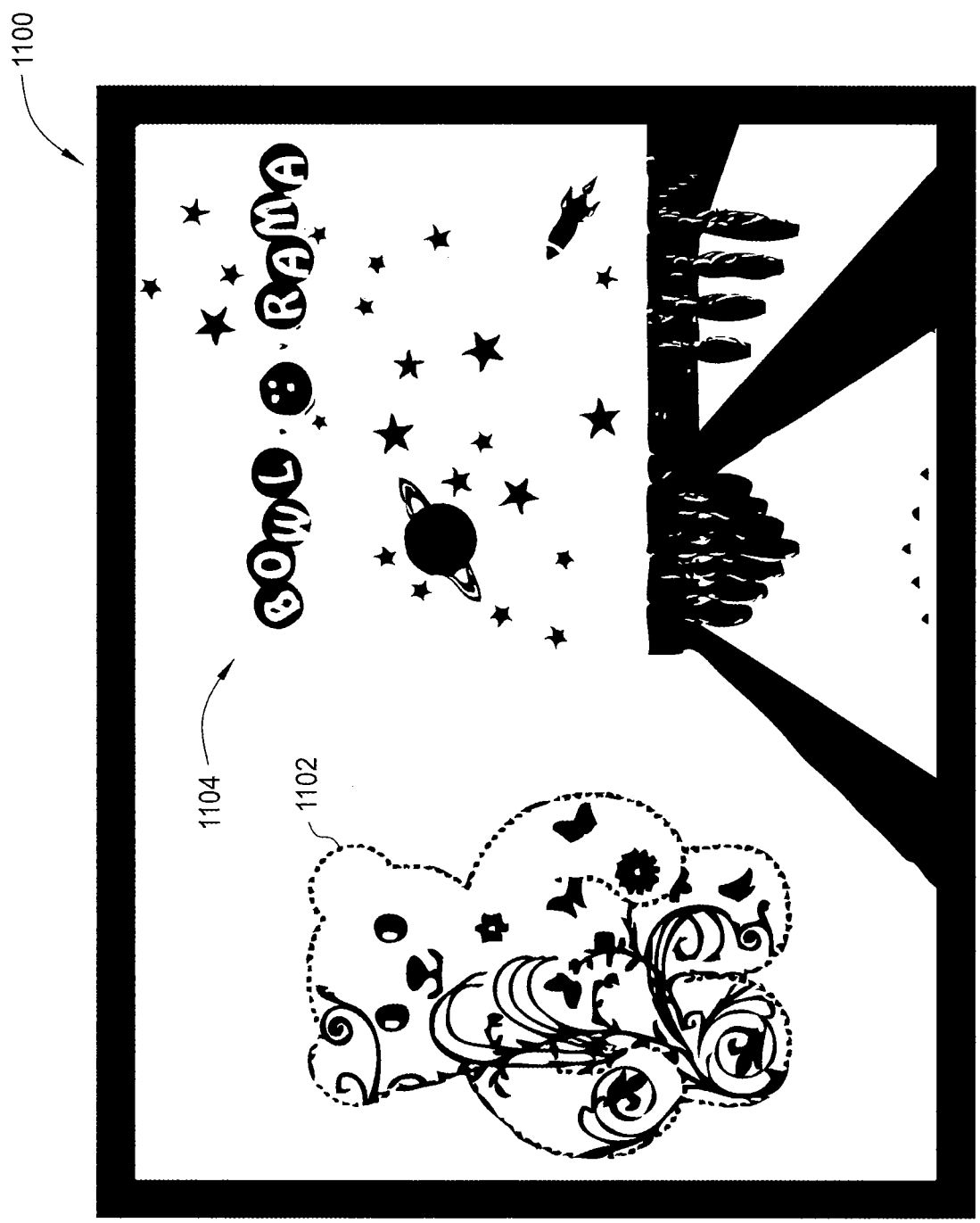
FIG. 11 is a screen shot illustrating a display window that includes a customized stuffed toy and a customized backdrop, according to one embodiment of the invention.

FIG. 11 is a screen shot 1100 illustrating a display window that includes a virtual customized stuffed toy 1102 and a virtual customized backdrop 1104, according to one embodiment of the invention. As shown, both the stuffed toy 1102 and the customized backdrop 1104 are displayed to include the customizations created by the user. The computer system is able to determine this customization information by reading the RFID tags of the stuffed toy and backdrop that are read by the RFID reader included in the stage. Since each stuffed toy and backdrop is created with a unique RFID tag, the appropriate designs are displayed on the display screen on the computer system. The displayed toy environment can provide any number of options for user interaction, including games and other interactive activities based around the customized toy and environment.

In some embodiments, a user can physically swap out the backdrop or stuffed toy that is in communication with the RFID reader to change what is displayed on the computer screen. For example, if the backdrop represents a bowling alley, then a virtual bowling alley environment is displayed on the display screen. If, for example, the user places a first stuffed toy having a first RFID tag onto the stage, then the virtual toy that appears on the display corresponds to the design of the first stuffed toy that is physically on the stage. The user can then interact with the virtual first stuffed toy via the computer system. If the user takes the first stuffed toy off the stage and replaces the first stuffed toy with a second stuffed toy having a second RFID tag, then the virtual toy that appears on the display corresponds to the design of the second stuffed toy, which is now physically on the stage. The user can then interact with the virtual second stuffed toy via the computer system.

The software can also be configured to upload data from the interactions and designs created to be shared with a network of other users. The software may be configured to provide user communities, competitions, and other networked interactions, each of which further heighten the playability of the customized stuffed toy. The software may be configured to prompt the user to select the particular stuffed toy or backdrop in RFID communication with the RFID reader the first time that the particular stuffed toy or backdrop is in RFID communication in order to associate that particular RFID tag with that particular customized design. For example, the user may print several different customized stuffed toys. The first time that a user places one of the stuffed toys onto the stage, the software may be configured to prompt the user to select, from a listing of previously-created custom designs, the design of the stuffed toy that is currently in RFID communication. Once the user makes the selection, then the software associates the unique RFID tag with a particular customized toy. The next time that the user places that particular stuffed toy in RFID communication, the software already recognizes the RFID tag and can determine which stuffed toy is on the stage. The software may then display a virtual "avatar" of the customized stuffed toy on the display screen.

The system 900 may include any number of each of the different components described above and may include additional components to maximize customizability and playability of the system 900. In some embodiments, the stage 904 may include wheels for easy transportation and additional playability. In further embodiments, the stage 904 may be painted, unpainted, or decorated as desired by the user. In yet further embodiments, the backdrop 914 may include two or more RFID tags to communicate with the RFID reader. In some embodiments, the data cable 910 is omitted and RFID tag information is transmitted to the computer system with any technically feasible technique, including Bluetooth or other wireless connection, among others.

In some embodiments, the clip-on base includes grips that, once locked, secure the customized stuffed toy from slipping out or losing stuffing. In other embodiments, the clip-on base includes a rubber coating on the grips to further assist in keeping the stuffed toy from slipping out of the clip-on base. In yet further embodiments, the clip-on base comprises a shape other than shoes. In still further embodiments, the software application that allows for the customization of stuffed toys and/or backdrops is installed in a kiosk that may be included in a retail location, a shopping mall, a pharmacy, or in any other location.

In still further embodiments, the composite sheet is not decorated by printing a design onto the composite sheet. Instead, the composite sheet may be decorated by the user with markers, pens, or other writing instruments. For example, the stuffed toy kit may include one or more writing instruments with the blank composite sheet to allow the user to draw a customized design directly onto the composite sheet.

As should be understood by those having ordinary skill in the art, embodiments of the invention described with reference to composite sheets used for creating a customized stuffed toy apply equally to composite sheets used for creating customized clothing. For example, embodiments of the invention described in FIGS. 5-11 may also be applied to creating a customized design for clothing on the composite sheet. Additionally, as described above, the customized clothing can be worn by either a doll or a person.

One advantage of the systems and methods disclosed herein is that users can create customized stuffed toys conveniently on their own home printer. A second advantage is that if the customized stuffed toy is misplaced, then a second "copy" of the same customized stuffed toy can be printed. Finally, providing communication between the customized stuffed toy and a computer system provides a unique and enjoyable user experience where the user can associate the virtual stuffed toy that interacts in various environments with the "real" stuffed toy physically in their possession.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for creating a customized toy, comprising:
   receiving an input specifying a shape for the customized toy;
   displaying on a display device a user interface for customizing a design of the customized toy, wherein the user interface includes a template that corresponds to the shape for the customized toy;
   receiving a user input specifying the design of the customized toy; and
   causing the design of the customized toy to be printed onto a composite sheet that includes a first fabric portion that was previously sewn with stitching to a second fabric portion, wherein the stitching defines an outline of the customized toy and the composite sheet additionally includes a paper membrane portion disposed between the first and second fabric portions.

2. The method of claim 1, further comprising the step of saving the design of the customized toy in a memory.

3. The method of claim 1, wherein the user input specifies a design for at least one of eyes, a nose, a mouth, or paws of the customized toy.

4. The method of claim 1, wherein the customized toy is associated with a radio-frequency identification (RFID) tag.

5. The method of claim 4, wherein an RFID reader is included in a stage coupled to a computer system, and the RFID reader is configured to transmit the RFID tag to the computer system.

6. The method of claim 1, wherein the customized toy comprises a customized stuffed toy.

7. The method of claim 1, wherein the customized toy comprises customized clothing.

8. A non-transitory computer-readable medium storing instructions that, when executed by a processor, cause a computer system to create a customized toy, by performing the steps of:
   receiving an input specifying a shape for the customized toy;
   displaying on a display device a user interface for customizing a design of the customized toy, wherein the user interface includes a template that corresponds to the shape for the customized toy;
   receiving a user input specifying the design of the customized toy; and
   causing the design of the customized toy to be printed onto a composite sheet that includes a first fabric portion that was previously sewn with stitching to a second fabric portion, wherein the stitching defines an outline of the customized toy and the composite sheet additionally includes a paper membrane portion disposed between the first and second fabric portions.

9. The computer-readable medium of claim 8, further comprising the step of saving the design of the customized toy in a memory.

10. The computer-readable medium of claim 8, wherein the user input specifies a design for at least one of eyes, a nose, a mouth, or paws of the customized toy.

11. The computer-readable medium of claim 8, wherein the customized toy is associated with a radio-frequency identification (RFID) tag.

12. The computer-readable medium of claim 11, wherein an RFID reader is included in a stage coupled to a computer system, and the RFID reader is configured to transmit the RFID tag to the computer system.

13. The computer-readable medium of claim 8, wherein the customized toy comprises a customized stuffed toy.

14. The computer-readable medium of claim 8, wherein the customized toy comprises customized clothing.

15. A system for creating a customized toy, comprising:
   a composite sheet that includes a first fabric portion that is sewn with stitching to a second fabric portion, wherein the stitching defines an outline of the customized toy and the composite sheet additionally includes a paper membrane portion disposed between the first and second fabric portions;
   a printer; and
   a computing device, including:
   a display device,
   a processor, and
   a memory storing instructions that when executed by the processor cause the computing device to perform the steps of:
   receive an input specifying a shape for the customized toy, display on the display device a user interface for customizing a design of the customized toy, wherein the user interface includes a template that corresponds to the shape for the customized toy, receive a user input specifying the design of the customized toy, and cause the design of the customized toy to be printed by the printer onto the composite sheet.

16. The system of claim 15, wherein the instructions further cause the computing device to save the design of the customized toy in a memory.

17. The system of claim 15, wherein the user input specifies a design for at least one of eyes, a nose, a mouth, or paws of the customized toy.

18. The system of claim 15, wherein the customized toy is associated with a radio-frequency identification (RFID) tag.

19. The system of claim 18, further comprising a stage coupled to the computing device, and wherein an RFID reader is included in the stage, and the RFID reader is configured to transmit the RFID tag to the computing device.

20. The system of claim 15, wherein the composite sheet is perforated to allow for removal of the outline of the customized toy from the composite sheet.

21. The system of claim 15, wherein the customized toy comprises a customized stuffed toy.

22. The system of claim 15, wherein the customized toy comprises customized clothing.

* * * * *